(12) United States Patent
Handforth et al.

(10) Patent No.: US 6,507,654 B1
(45) Date of Patent: Jan. 14, 2003

(54) LINE INTERFACE BATTERY FEED ARRANGEMENTS WITH PTC RESISTORS

(75) Inventors: Martin Ridgway Handforth, Kanata (CA); Donald Scott McGinn, Ashton (CA); Gyula Jakab, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/216,975

(22) Filed: Dec. 21, 1998

(51) Int. Cl.[7] .............................. H04M 1/00; H04M 9/00
(52) U.S. Cl. ............. 379/412; 379/399.01; 379/399.02; 379/413.04; 379/413; 361/94; 361/119; 338/22 R
(58) Field of Search .................. 379/399.01, 412, 379/413.04, 385, 93.05, 399.02; 338/22 R; 361/94, 119

(56) References Cited

U.S. PATENT DOCUMENTS

| | | | |
|---|---|---|---|
| 4,467,310 A | 8/1984 | Jakab | 338/22 |
| 4,514,595 A | 4/1985 | Rosenbaum et al. | 179/16 |
| 4,727,574 A | 2/1988 | Jakab | 379/413 |
| 4,856,059 A * | 8/1989 | Halbig | 379/412 |
| 4,947,427 A * | 8/1990 | Rosch et al. | 379/412 |
| 4,982,426 A | 1/1991 | Jakab | 379/402 |
| 5,333,192 A | 7/1994 | McGinn | 379/399 |
| 5,696,660 A | 12/1997 | Price | 361/119 |
| 5,777,836 A | 7/1998 | Price et al. | 361/94 |
| 6,198,818 B1 * | 3/2001 | Bingel | 379/399.01 |

* cited by examiner

Primary Examiner—Forester W. Isen
Assistant Examiner—Con P. Tran

(57) ABSTRACT

A telephone line interface circuit is disclosed that functions with use of PTC resistors so that temperature increases within the battery feed resistors is minimized. Utilizing current and voltage feedback loops within the line interface circuit, the PTC resistors are implemented without significantly reducing the performance of the overall circuit that would normally be caused by the PTC resistors' inherent impedance inaccuracies. In normal operation, the feedback loops adjust the current and voltage on the telephone line to the desired level without regard for the impedance values of the PTC resistors. In the case that a high voltage is applied to a telephone line, the significant increase in current flow into the line interface circuit causes the battery feed resistors to heat up, and therefore the PTC resistors, that are physically local to the feed resistors, to heat up and significantly increase in impedance.

4 Claims, 3 Drawing Sheets

LINE INTERFACE BATTERY FEED ARRANGEMENTS WITH PTC RESISTORS

FIELD OF THE INVENTION

This invention relates generally to thermal resistors and more specifically to applications for positive temperature coefficient (PTC) resistors.

BACKGROUND OF THE INVENTION

PTC resistors have been utilized within telephone line interface circuits as disclosed within U.S. Pat. No. 4,467,310 entitled "Telephone Subscriber Line Battery Feed Resistor Arrangements" by Jakab and assigned to the assignee of the present invention, herein incorporated by reference. The use of such PTC resistors within patent '310 is done to reduce the thermal risks in the event that a relatively high external voltage is applied to one or both of the wires of the subscriber line pair. This situation could occur if a power line came into contact with the subscriber line. In such a circumstance, the resulting high current flow could cause the battery feed resistors within the applicable line interface circuits to heat up, further causing semiconductor devices within the line interface module to exceed their maximum rated junction temperatures.

To prevent this risk, PTC resistors, as disclosed within the '310 patent, are placed in series with thick film resistors that together with the PTC resistors function as the battery feed resistors. In normal operation, the thick film resistors dominate the total impedance of each battery feed resistor, since the thick film resistors have impedances in the order of ten to thirty times those of the PTC resistors. During a period of extremely high current, the PTC resistors increase in temperature, which causes a drastic increase in their impedances and therefore a drastic increase in the impedances of the corresponding battery feed resistors. This limits the current flow, which subsequently avoids any further rise in temperature. After the high current source has been removed from the particular telephone lines, the impedance of the PTC resistors drops back to normal levels as the temperature is reduced.

One key problem with such a set up is the fact that although the impedances of the PTC resistors in normal operation are small relative to the values of their corresponding thick film resistors, the PTC resistors still significantly influence the overall impedance of the battery feed resistors and the critical balancing within each pair of subscriber lines. As disclosed within the '310 patent, the battery feed resistors should be matched within 0.3% to maintain good balance within the pair of subscriber lines in which the resistors are attached. Unfortunately, PTC resistors are not extremely accurate. The PTC resistors, within the setup disclosed in the '310 patent, are approximately 3% to 10% of the overall impedance of the battery feed resistors during normal operations and are only accurate to approximately 25%.

The '310 patent solves this matching problem by utilizing two PTC resistors manufactured in the same batch, so that the PTC resistors presumably would be more closely matched. Although the use of PTC resistors from the same batch reduces the problem, it does not eliminate it in all circumstances. After a PTC resistor is driven to a high impedance state, during a high temperature period, the PTC resistor does not necessarily return to precisely the same impedance as it had been prior to the high impedance period. In such cases, it is unlikely that the PTC resistors continue to be well matched, and therefore unlikely that the overall battery feed resistors are matched within the acceptable error range of 0.3% between the individual subscriber lines. Due to these problems which reduce the performance of the telephone system as a whole, the addition of PTC resistors within line interface circuits have not been commonly implemented.

Prior art line interface circuits have been implemented with alternative safety features that function to combat similar high voltage problems as set out herein above. The most common safety feature utilized within line interface circuits is electrical relays. These relays are placed between the line interface circuit and the telephone lines. In the situation that the voltage on the telephone lines exceeds a threshold, the relays automatically cause an open circuit of the line interface circuit, therefore preventing damage to the particular interface circuit. Unfortunately, relays take up significant space on a line interface circuit, are not economical in all situations, and require power supplied by the telephone central office to operate properly.

Alternatively, some prior art line interface circuits include fuses between the line interface circuits and the telephone lines, in order to prevent high voltages on the telephone lines from causing damage. These fuses are made to blow, and therefore leave an open circuit, when the voltage on the subscriber lines exceeds a threshold, similar to a relay. The advantages of using fuses over relays is that fuses are smaller, cheaper, and operate without requiring power from the central telephone office. The key disadvantage of fuses over both the electrical relays and the PTC resistor implementation, disclosed within the '310 patent, is that once a fuse is blown, there is no method for resetting it. Therefore, if a fuse blows, the entire line interface module in which the line interface circuit is implemented must be replaced. Since a very common technique in line interface modules is to implement 32 per board, if a fuse is blown in one circuit, the entire board must be replaced, hence increasing financial and time costs.

Overall, the implementation of PTC resistors appears to have the best qualities of both the electrical relays and the fuses. PTC resistors within a line interface circuit are economical, do not require power to operate properly, and automatically reset after the high voltage source is removed from the telephone line. The key disadvantage of PTC resistors, as presently implemented, is the lack of accuracy with regard to their impedances, especially after returning from a high impedance state.

Hence, an implementation of PTC resistors is needed that will allow the functionality of PTC resistors to be realized, without affecting the overall performance of an impedance sensitive circuit. This implementation should be applicable within a telephone line interface circuit, such that the PTC resistors can realize similar benefits as those described in the '310 patent, without causing additional problems within the overall circuitry.

SUMMARY OF THE INVENTION

It is an object of the present invention to overcome the disadvantages of the prior art and, in particular, to provide an apparatus whereby a PTC resistor can be efficiently utilized.

According to a first aspect, the present invention provides an apparatus comprising: at least one first node; at least one first resistor that increases in temperature under predetermined conditions; at least one positive temperature coefficient (PTC) resistor, thermally coupled and electrically coupled in series to the first resistor, that significantly increases in impedance when the first resistor and hence the PTC resistor significantly increases in temperature; a current detection device, coupled to the first node that detects the current flowing through the first node to generate a detected current signal; a voltage detection device, coupled to the first node, that detects the voltage on first node to generate a detected voltage signal; and an impedance adjustment device, input with the detected current and voltage signals, that, in normal operation, adjusts the current flowing through the first node and the voltage on the first node to maintain approximately a predetermined desired impedance level on the first node; wherein at least one of the first resistor and the PTC resistor is coupled to the first node.

According to a second aspect, the present invention provides an apparatus arranged to be coupled to a first and second transmission line at first and second nodes respectively comprising: first and second resistors that increase in temperature under predetermined conditions; first and second positive temperature coefficient (PTC) resistors, thermally coupled and electrically coupled in series to the first and second resistors via third and fourth nodes respectively, that significantly increase in impedance when the first and second resistors and hence the first and second PTC resistors respectively significantly increase in temperature; a current detection device, coupled to the first and second nodes, that detects a difference in the current flowing through the first and second nodes to generate a differential current signal; a voltage detection device, coupled to the first and second nodes, that detects a difference in voltage on the first and second nodes to generate a differential voltage signal; and an impedance adjustment device, input with the differential current and voltage signals, that, in normal operation, adjusts the current flowing through the first and second nodes and the voltage on the first and second nodes to maintain approximately a predetermined desired impedance level between the first and second nodes; wherein at least one of the first resistor and first PTC resistor is coupled to the first node and at least one of the second resistor and the second PTC resistor is coupled to the second node.

According to a third aspect, the present invention provides a line interface circuit for supplying energizing current from power terminals to a two wire communication line and for coupling communications signals between the communication line and a telephone facility via a hybrid circuit means, comprising: tip and ring terminals for connection to the two wire communication line; hybrid transmit and receive terminals for connection to the hybrid circuit means; a tip and ring signal voltage detector, being responsive to differential signals appearing across the tip and ring terminals and being of at least a voice band frequency, and being responsive to signals appearing at the receive terminal, for generating a composite signal; a loop driver circuit including a voltage amplifier having an input for receiving a control signal and an output, and a transformer having a tip winding being coupled in series with the tip terminal and one of the power terminals, a ring winding coupled in series between the ring terminal and another of the power terminals, the tip and ring windings providing paths for the energizing current to flow and being poled such that energizing current flow is of a flux aiding effect, and a primary winding being coupled in series with the output of the voltage amplifier; the loop driver circuit being responsive to the control signal for driving alternating current signals via the tip and ring terminals; a loop current detector, being coupled in series between the tip and ring terminals and the loop driver circuit, for generating a supervision signal in response to current flow in the communication line; a network having a first port being connected to receive the composite signal from the tip and ring signal voltage detector, a second port being connected to receive the supervision signal from the loop current detector, and a third port being connected to the input of the voltage amplifier for providing the control signal; a tip positive temperature coefficient (PTC) resistor coupled between the tip terminal and the tip winding; and a ring PTC resistor coupled between the ring terminal and the ring winding; wherein the tip and ring PTC resistors are each thermally coupled to at least one resistor coupled to the tip and ring terminals respectively; and each particular PTC resistor will significantly increase in impedance, if the particular resistor that the PTC resistor is thermally coupled to significantly increases in temperature, hence increasing the temperature of the particular PTC resistor.

BRIEF DESCRIPTION OF THE DRAWINGS

The preferred embodiment of the present invention is described with reference to the following figures, in which.

DETAILED DESCRIPTION OF THE PREFERRED EMBODIMENT

Exemplary embodiments of the present invention are the implementation of PTC resistors within impedance sensitive circuits that include a current and voltage feedback loop. This feedback loop allows the PTC resistors to be included within the circuit despite the high uncertainty concerning the impedance of such resistors. Although the preferred embodiment of implementing PTC resistors within a well known line interface circuit is described in detail herein below, this description is not meant to limit the scope of the present invention to such a circuit. It should be understood by one skilled in the art that the invention can be extended to any circuit with both current and voltage feedbacks in which PTC resistors can be found useful.

Figure 1:
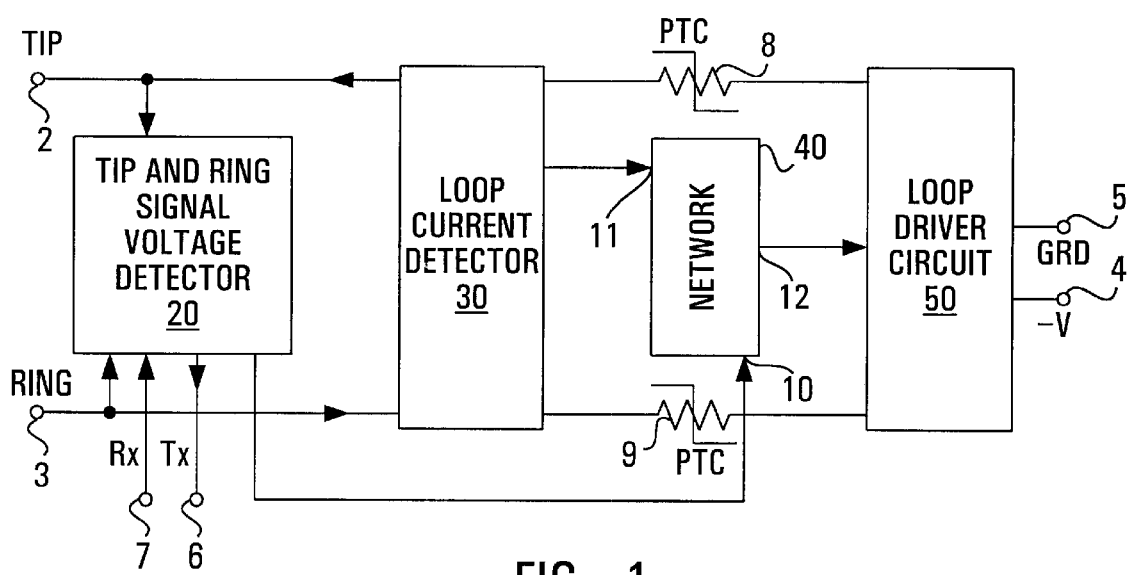
FIG. 1 illustrates a block diagram of a line interface circuit according to one embodiment of the present invention.
Figure 2:
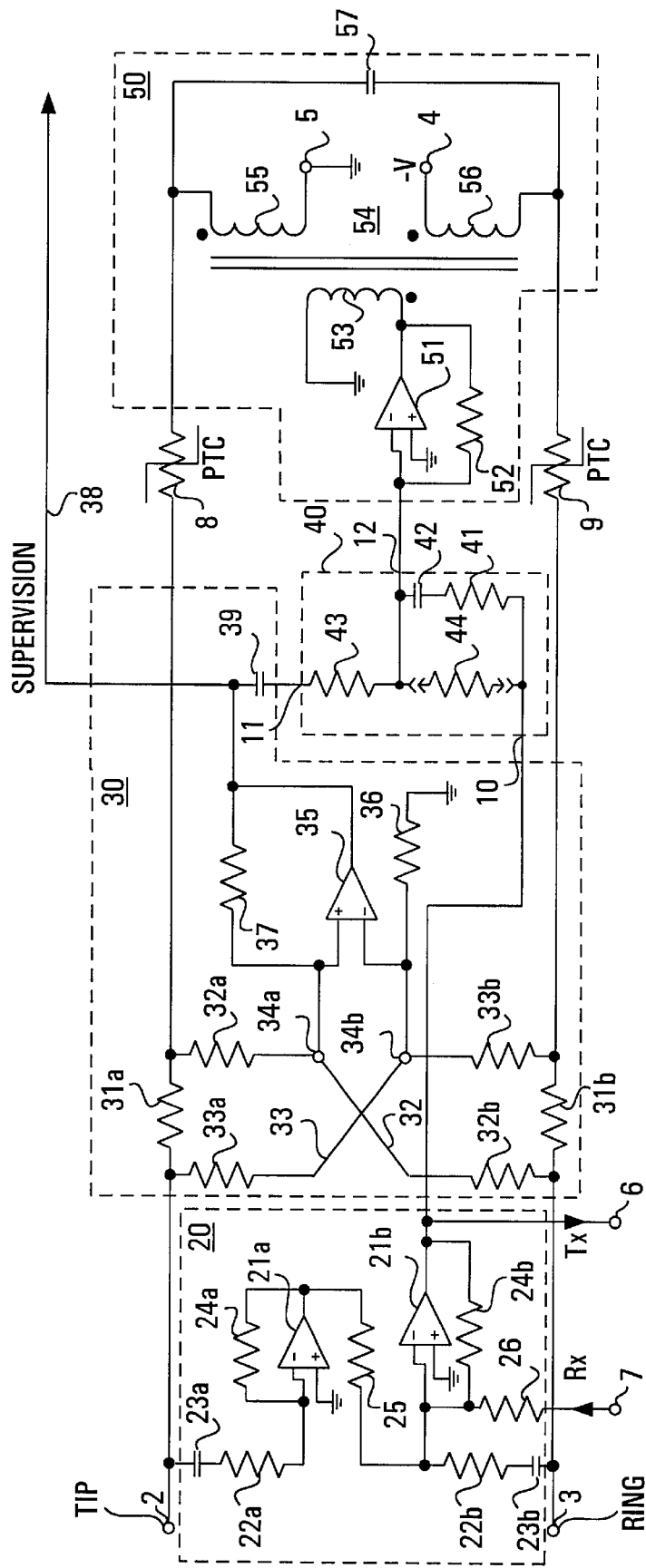
FIG. 2 illustrates a schematic diagram of a sample implementation of the line interface circuit of FIG. 1.

A line interface circuit is now described, according to a preferred embodiment of the present invention, with reference to FIGS. 1 and 2. This line interface circuit is modified from a line interface circuit disclosed within U.S. Pat. No. 5,333,192 entitled "Line Interface Circuit" by McGinn and assigned to the assignee of the present invention, herein incorporated by reference. The detailed description of the functioning of such a line interface circuit is included within the '192 patent with some excerpts included herein below.

The line interface circuit of FIG. 1 comprises tip and ring terminals 2,3 for connection to the tip and ring leads of a telephone line (not shown), power –V and ground GRD terminals 4,5 for connection to a battery supply (not shown), and transmit (Tx) and receive (Rx) terminals 6,7 for connection to an electronic hybrid circuit (not shown). Some of the signals appearing at the Tx terminal 6 are destined for an associated telephone facility (not shown), and are selected by the electronic hybrid circuit for transmission into the telephone facility. Signals appearing at the Rx terminal 7 from the hybrid circuit, are destined for transmission via the tip and ring terminals 2,3, to the telephone line.

The line interface circuit of FIG. 1 further comprises a tip and ring signal voltage detector 20, a loop current detector 30, a network 40, a loop driver circuit 50, and tip and ring PTC resistors 8,9. The tip and ring signal voltage detector 20 is responsive to differential signals appearing across the tip and ring terminals 2,3 for generating a signal, that when combined with the signal at the Rx terminal 7, provide a composite signal. The composite signal is fed to a first port 10 of the network 40 and is supplied to the electronic hybrid circuit via the Tx terminal 6.

An example of a possible implementation of the tip and ring signal voltage detector 20 is illustrated within FIG. 2. Within this implementation, the voltage detector 20 comprises a tip amplifier circuit and a ring amplifier circuit. The tip amplifier circuit is provided by an amplifier 21a, a resistor 22a and a capacitor 23a connected in series between the tip terminal 2 and the input of the amplifier 21a, and a resistor 24a connected across the amplifier 21a. The ring amplifier circuit is provided by an amplifier 21b, a resistor 22b and a capacitor 23b connected in series between the ring terminal 3 and the input of the amplifier 21b, and a resistor 24b connected across the amplifier 21b. The capacitors 23a,23b serve to isolate the respective amplifiers 21a,21b from DC potentials at the tip and ring terminals 2,3. A resistor 25 is connected from the output of the amplifier 21a to the input of the amplifier 21b, such that in combination only differential signals appearing across the tip and ring terminals 2,3 are reproduced at the output of the amplifier 21b. Receive signals from the electronic hybrid circuit and destined for the telephone line are coupled, via the Rx terminal 7 and a resistor 26, to the input of the differential amplifier 21b. The output of the amplifier 21b, the composite signal, is input to the first port 10 of the network 40 and to the Tx terminal 6. In the preferred embodiment, the composite signal $K_V V_{tr}$ is equal to a scalar constant $K_V$, that depends on the actual implementation, multiplied by the differential voltage $V_{tr}$ between the tip and ring terminals 2,3.

Referring again to FIG. 1, the loop current detector 30 is connected in series with the loop driver circuit 50 via the tip and ring PTC resistors 8,9 and the tip and ring terminals 2,3 such that all of the current flowing along a telephone line, via the tip and ring terminals 2,3, also traverse the loop current detector 30. The loop current detector 30 is responsive to differential current flowing via the tip and ring terminals 2,3 for generating a line signal which is useful in an associated telephone facility for detecting ON HOOK and OFF HOOK conditions. The line signal is also supplied to a second port 11 of the network 40.

A possible implementation of the loop current detector 30 is shown with reference to FIG. 2. In this implementation, the loop current detector 30 comprises a resistor network having a tip feed resistor 31a and a ring feed resistor 31b, each of which conducts virtually all of the current traversing the tip and ring terminals 2,3 respectively. The resistor network further comprises tip and ring voltage dividers 32,33 provided by resistors 32a,32b and resistors 33a,33b respectively. Resistors 32a,32b are connected in series between the node of the tip feed resistor 31a not connected to the tip terminal 2 and the node of the ring feed resistor 31b connected to the ring terminal 3. Resistors 33a,33b are connected in series between the node of the tip feed resistor 31a connected to the tip terminal 2 and the node of the ring feed resistor 31b not connected to the ring terminal 3. The node between the resistors 32a,32b and the node between the resistors 33a,33b are defined as tip and ring taps 34a,34b respectively. The tip and ring taps 34a,34b are connected across a differential input of a differential amplifier 35 with resistor 36 connected between the ring tap 34b and ground, and with resistor 37 connected between the tip tap 34a and the output of the amplifier 35. Currents related to currents in the tip and ring feed resistors 31a,31b are conducted via the tip tap 34a and resistor 37 and via ring tap 34b and resistor 36 respectively. Hence, the differential amplifier 35 is direct coupled to generate the previously mentioned line signal. In the preferred embodiment, the line signal $K_I I_{tr}$ is equal to a scalar constant $K_I$, that depends on the actual implementation, multiplied by the differential current $I_{tr}$ traversing the tip and ring terminals 2,3.

The line signal is applied to a supervision lead 38 for use in the telephone facility and the second port 11 of the network 40 via a capacitor 39. The capacitor 39 serves to isolate the network 40 from a direct current potential at the output of the amplifier 35.

Referring again to FIG. 1, the composite signal at the first port 10 and the line signal at the second port 11 combine in the network 40 to provide a feedback signal which is input to the loop driver circuit 50 via a third port 12 in the network 40. A possible implementation of the network 40 is illustrated within FIG. 2. This implementation comprises a resistor 41 and a capacitor 42 connected in series between the first port 10 and the third port 12, a resistor 43 connected between the second port 11 and the third port 12, and an optional resistor 44 connected between the first port 10 and the third port 12 that is required in those cases where an operating telephone company's standard line terminating impedance includes a parallel resistance value.

Referring back to FIG. 1, the loop driver circuit 50 connects the tip and ring terminals 2,3 with the −V and GRD terminals 4,5 to provide a flow of energizing direct current for the operation of a telephone while it is OFF HOOK. The loop driver circuit 50 also drives voltage and alternating current signals on the tip and ring terminals 2,3 such that the line interface circuit terminates the telephone line with a characteristic active impedance which substantially corresponds to a predetermined preferred input impedance as will be described herein below.

One implementation of the loop driver circuit 50, as illustrated in FIG. 2, comprises a differential amplifier 51 with a first input connected to the third port 12 of the network 40, a second input connected to ground, and an output connected to a primary winding 53 of a transformer 54. A feedback resistor 52 is connected between the first input and the output of the amplifier 51 and is of a value selected to cause the amplifier 51, in the preferred embodiment, to operate with a gain of about 100. The transformer 54 comprises a tip winding 55 connected on one side in series with the tip feed resistor 31a and the tip PTC resistor 8, and connected on the other side with the GRD power terminal 5, and a ring winding 56 connected on one side in series with the ring feed resistor 31b and the ring PTC resistor 9, and connected on the other side with the −V terminal 4. A capacitor 57 is connected across the tip and ring windings 55,56 to reduce electrical noise. The windings 55,56 are poled in a flux reinforcing direction, as illustrated in FIG. 2, by conventional dot notation. In operation, energizing direct current is driven along a path which includes the −V and GRD terminals 4,5 and the tip and ring windings 55,56.

In the preferred embodiment, the output from the amplifier 51 is a boosted feedback signal which represents a signal required to make the two inputs of the amplifier 51 equal (hence zero), multiplied by a gain G. The feedback signal, input to the amplifier 51 represents the actual loop current subtracted from a signal that represents the actual differential voltage multiplied by a transfer function $H_z(s)$ generated with use of resistor 41, capacitor 42, and possibly resistor 44. The signal that represents the actual loop current is the line signal $K_I I_{tr}$ while the signal that represents the actual differential voltage is the composite signal $K_V V_{tr}$. Therefore, the boosted feedback signal is equal to the following formula:

Boosted Feedback Signal=$[H_z(s)K_V V_{tr} - K_I I_{tr}]G$

This boosted feedback signal, representing an error adjustment used to correct the predetermined input impedance, is then input to the transformer 54.

The alternating current traversing the tip and ring terminals 2,3 and the differential voltage between the tip and ring terminals 2,3 are adjusted with use of the boosted feedback signal described herein above and the transformer 54, in order to bring the actual alternating current and differential voltage to levels required to maintain the active input impedance for the line interface circuit at the desired level. The amplifier 51 outputs the boosted feedback signal with voltage and current components to the transformer 54. The transformer 54 subsequently drives a current through both the tip and ring feed resistors 31a,31b and adds or subtracts voltage on the tip and ring terminals 2,3 to adjust the actual input impedance across the tip and ring terminals 2,3.

Since, in simplistic terms, the boosted feedback signal represents the difference between the actual and desired impedance values, the adjustments made to the actual alternating current and differential voltage result in a decrease in the error, until eventually the feedback signal input to the amplifier 51 becomes approximately zero, hence equal to the second input to the amplifier 51. At this point, it can be seen that the boosted feedback signal will be equal to zero and the following expression can be generated:

$K_I \cdot I_{tr} \approx H_z(s) \cdot K_V 19\ V_{tr}$ which can be re-expressed as:

$$Z_i \approx \frac{V_{tr}}{I_{tr}} \approx \frac{K_I}{H_z(s) \cdot K_V}$$

where $Z_i$ is the tip to ring active input impedance for the line interface circuit. Since $K_I$ and $K_V$ are designed into the line interface circuit, as long as the amplifier 51 has sufficient gain to overcome the difference between the actual and desired input impedance levels, the actual alternating current traversing the tip and ring terminals 2,3 and actual differential voltage between the tip and ring terminals 2,3 can be controlled with use of the transfer function $H_z(s)$ to maintain the active input impedance of the line interface circuit at the desired impedance level.

It should be understood that the amplifier 51 combined with the transformer 54 can be considered an impedance adjustment device that, when input with the line and composite signals, maintains, in normal operation, the desired impedance level between the tip and ring terminals 2,3.

As illustrated in FIG. 1, the tip and ring PTC resistors 8,9 are connected between the loop current detector 30 and the loop driver circuit 50. This setup places both the tip and ring PTC resistors 8,9 within an active impedance feedback loop of the line interface circuit. While the voltage detector 20 and the loop current detector 30 output signals that respectively represent the differential voltage and current corresponding to the tip and ring terminals 2,3, the network 40 along with the loop driver circuit 50 use these signals to adjust the alternating current traversing and the differential voltage between the tip and ring terminals 2,3 in order to maintain the active input impedance for the line interface circuit at the desired level, as described previously. Any influence the values of the feed resistors 31a,31b and PTC resistors 8,9 have on the differential voltage and alternating current within the line interface circuit is compensated for inherently by the impedance feedback loop.

As illustrated within FIG. 2, the nodes on one side of the tip and ring PTC resistors 8,9 are connected to the respective nodes of the tip and ring feed resistors 31a,31b that are not connected to the tip and ring terminals 2,3. The other nodes of the tip and ring PTC resistors 8,9 are connected to the tip and ring windings 55,56 respectively. In the above described setup, the inaccuracy associated with the PTC resistors 8,9 does not, in normal operation, significantly influence the performance of the overall line interface circuit, including the input and output impedances, insertion loss, and longitudinal balance. It is recognized that, in normal operations, the PTC resistors 8,9 will cause metallic voltages to be generated between the particular PTC resistor 8,9 and its corresponding feed resistor 31a,31b. This metallic voltage though will be compensated for at the tip and ring terminals 2,3 by the current and voltage feedback loops, hence maintaining longitudinal balance. Variations in the PTC resistors 8,9 can, in fact, be considered disturbances that are cancelled out by the overall feedback circuit within the preferred embodiment.

In the case that a high voltage is applied to one or both of the subscriber line wires, as might happen if the subscriber line came into contact with a power transmission line, a series of physical steps occur within the line interface circuit of FIG. 1. Firstly, the overall current flowing through the tip and ring terminals 2,3 and therefore through the tip and ring feed resistors 31a,31b would significantly increase. This, in turn, would increase the temperature of the feed resistors 31a,31b. In prior art line interface circuits, this heating up of the feed resistors 31a,31b could cause the maximum junction temperature to be exceeded for the semiconductor device in which the line interface circuit 102 is implemented, unless some form of electrical protection is used such as a relay. The key problem with using relays is their size and cost.

In the setup according to FIG. 1, when the tip and ring feed resistors 31a,31b heat up, the PTC resistors 8,9, which are physically adjacent to the feed resistors 31a,31b, also heat up. Within the PTC resistors 8,9 used within the preferred embodiment of the present invention, this results in a significant increase in the impedance of the PTC resistors 8,9 in the range of going from less than 50 Ω to approximately 10 kΩ or more. This high impedance level for the PTC resistors 8,9 does not allow the voltage and current feedback loops to compensate for the impedances of the PTC resistors 8,9 since the cancelling voltage that would be required is outside the voltage rails available to the amplifier 51.

This increase in impedance of the PTC resistors 8,9 limits the overall current flow through the feed resistors 31a,31b which subsequently reduces the power being dissipated within the feed resistors, hence reducing their corresponding temperatures. After the high voltage source is removed from the subscriber line, the overall current flowing through the feed resistors 31a,31b is reduced, resulting in the temperature of both the feed resistors 31a,31b and the PTC resistors 8,9 being reduced. This in turn causes, as discussed in the '310 patent, the impedance of the PTC resistors 8,9 to be reduced to approximately their original normal impedance, hence within the range that can be compensated for by the feedback loops.

In one embodiment of the line interface circuit, the above described process continues in a cyclical manner, in which as the temperature reduces within the feed resistors 31a,31b due to the high impedance of the PTC resistors 8,9, the temperature and therefore impedance corresponding to the PTC resistors 8,9 also decreases. This reduction of impedance subsequently causes an increase in the overall current and a slight reheating of the feed resistors 31a,31b.

In the line interface circuit of FIG. 1, the circuit can be implemented with or without the electrical relays discussed herein above. If implemented without the relays, no resetting of the line interface circuits is necessary after a period of high voltage on the subscriber lines since the resetting of the PTC resistors 8,9 is done automatically. The implementation of both the PTC resistors 8,9 and the electrical relays within line interface circuits requires that the line interface circuits affected by a high voltage condition be reset after the condition is removed. Under some circumstances, it is noted that the PTC resistors in combination with the relays would provide the most complete and efficient safety coverage available.

Figure 3:
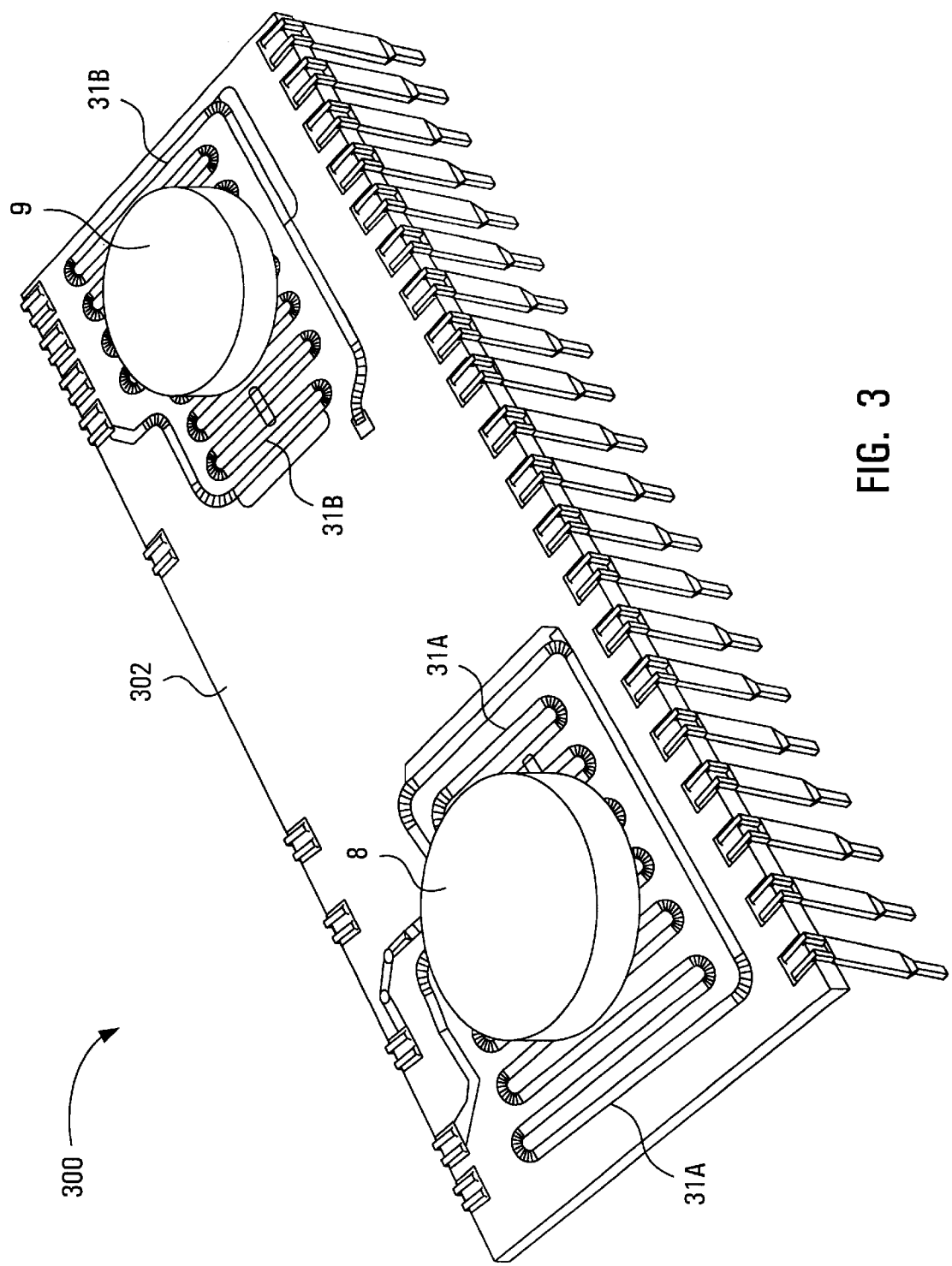
FIG. 3 illustrates a simplified top view of a module incorporating the line interface circuit of FIG. 2.

A simplified physical layout of a module 300 comprising selected components illustrated in FIG. 2 is now described with reference to FIG. 3. FIG. 3 depicts a module 300 with a ceramic substrate 302, the tip and ring PTC resistors 8,9, and the tip and ring feed resistors 31a,31b. The remaining circuitry of FIG. 2 is not shown since the physical implementation of this circuitry is not critical for the preferred embodiment of the present invention.

Within FIG. 3, the PTC resistors 8,9 are shown to be physically on top of the feed resistors 31a,31b. It is noted that there is an insulator layer (not shown), in the preferred embodiment, separating the tip and ring feed resistors 31a, 31b from the respective tip and ring PTC resistors 8,9. Therefore, although being physically local to the feed resistors 31a,31b, the PTC resistors 8,9 are electrically connected as in the schematic of FIG. 2. The PTC resistors 8,9 are electrically connected as shown in FIG. 2 with use of signal traces not shown on FIG. 3. In this preferred embodiment of the module 300, the PTC resistors 8,9 are placed on top of the feed resistors 31a,31b, so that when the feed resistors 31a,31b heat up, the PTC resistors heat up equivalently.

One key advantage of using the module 300 of FIG. 3 is that this setup reduces the risk of the ceramic substrate 302 heating up due to extremely high temperatures being applied from the feed resistors 31a,31b and subsequently exceeding its maximum junction temperature. The situations, as discussed herein above, in which the tip and ring resistors 31a,31b heat up are reduced with the addition of the PTC resistors 8,9. When the PTC resistors are put into a high impedance state, due to an increase in the temperature local to the PTC resistors 8,9, their is a reduction in the overall current flow through the feed resistors 31a,31b, and therefore a reduction in the temperature of the feed resistors 31a,31b and the subsequent temperature being applied to the ceramic substrate 302.

An additional embodiment of the present invention has the PTC resistors 8,9 located between the tip and ring terminals 2,3 respectively and the tip and ring feed resistors 31a,31b respectively rather than between the tip and ring feed resistors 31a,31b respectively and the tip and ring windings 55,56 respectively as described for the preferred embodiment. One skilled in the art would understand that this implementation would not reduce the effect of the present invention as long as the signal voltage detector 20 still senses the differential voltage across the tip and ring terminals 2,3. Hence, the amplifier 51 and transformer 54 can still compensate for the effect of the PTC resistors 8,9 to maintain the active input impedance constant.

Although the detailed description of the preferred embodiment is specific to a line interface circuit, there are numerous other applications in which PTC resistors may be utilized, within a setup according to the present invention, to reduce the disadvantages of the prior art. Currently, many such applications do not use PTC resistors due to the PTC resistor's relatively high impedance uncertainty, especially after a PTC resistor returns from a high impedance state. The present invention allows PTC resistors to be implemented within such applications, circuits, or modules with the use of current and voltage feedback loops that can automatically adjust for the impedance inaccuracies associated with the PTC resistors.

Persons skilled in the art will appreciate that there are alternative implementations and modifications possible to use an apparatus similar to that described above to implement PTC resistors within a feedback loop, and that the above implementation is only an illustration of this embodiment of the invention. The scope of the invention, therefore, is only to be limited by the claims appended hereto.

What is claimed is:

1. A line interface circuit for supplying energizing current from power terminals to a two wire communication line and for coupling communications signals between the communication line and a telephone facility via a hybrid circuit means, comprising:

tip and ring terminals for connection to the two wire communication line;

hybrid transmit and receive terminals for connection to the hybrid circuit means;

a tip and ring signal voltage detector, being responsive to differential signals appearing across the tip and ring terminals and being of at least a voice band frequency, and being response to signals appearing at the receive terminal, for generating a composite signal;

a loop driver circuit having an input for receiving a control signal and a pair of output terminals, the loop driver circuit being responsive to the control signal for driving alternating current signals on the pair of output terminals;

a loop current detector having a first pair of terminals connected to the tip and ring terminals respectively, a second pair of terminals and a third terminal, a tip feed resistor and a ring feed resistor connected between the first and second pairs of terminals wherein the loop current detector generates a supervision signal at the third terminal in response to current flow in the communication line;

a network having a first port being connected to receive the composite signal from the tip and ring signal voltage detector, a second port being connected to receive the supervision signal from the loop current detector, and a third port being connected to the input of the voltage amplifier for providing the control signal;

a tip positive temperature coefficient (PTC) resistor and a ring PTC resistor electrically coupled between the second pair of terminals of the loop current detector and the pair of output terminals of the loop driver circuit, the tip and ring PTC resistors being electrically connected in series respectively with the tip and ring feed resistors and being thermally coupled respectively to the tip and ring feed resistors;

whereby an increase in current through the tip and ring feed resistors causes an increase in temperature of the tip and ring feed resistors hence increasing the temperature and consequently the impedance of the PTC resistors.

2. A line interface circuit for supplying energizing current from power terminals to a two wire communication line and for coupling communications signals between the communication line and a telephone facility via a hybrid circuit means, comprising:

tip and ring terminals for connection to the two wire communication line;

hybrid transmit and receive terminals for connection to the hybrid circuit means;

a tip and ring signal voltage detector, being responsive to differential signals appearing across the tip and ring terminals and being of at least a voice band frequency, and being response to signals appearing at the receive terminal, for generating a composite signal;

a loop driver circuit including a voltage amplifier having an input for receiving a control signal and an output, and a transformer having a tip winding being coupled in series with a first output terminal of the loop driver circuit and one of a pair of power terminals, a ring winding coupled in series between a second output terminal of the loop driver circuit and another of the pair of power terminals, the tip and ring winding providing paths for the energizing current to flow and being poled such that energizing current flow is of a flux aiding effect, and a primary winding being coupled in series with the output of the voltage amplifier;

the loop driver circuit being responsive to the control signal for driving alternating current signals on the pair of output terminals;

a loop current detector having a first pair of terminals connected to the tip and ring terminals respectively, a second pair of terminals and a third terminal, a tip feed resistor and a ring feed resistor connected between the first and second pairs of terminals wherein the loop current detector generates a supervision signal at the third terminal in response to current flow in the communication line;

a network having a first port being connected to receive the composite signal from the tip and ring signal voltage detector, a second port being connected to receive the supervision signal from the loop current detector, and a third port being connected to the input of the voltage amplifier for providing the control signal;

a tip positive temperature coefficient (PTC) resistor and a ring PTC resistor electrically coupled between the second pair of terminals of the loop current detector and the first and second output terminals of the loop driver circuit, the tip and ring PTC resistors being electrically coupled in series respectively with the tip and ring feed resistors and being thermally coupled respectively to the tip and ring feed resistors;

whereby an increase in current through the tip and ring feed resistors causes an increase in temperature of the tip and ring feed resistors hence increasing the temperature and consequently the impedance of the PTC resistors.

3. A line interface current according to claim 1 wherein, during normal operating conditions, the tip and ring PTC resistors have impedances significantly less than the tip and ring feed resistors.

4. A line interface current according to claim 2 wherein, during normal operating conditions, the tip and ring PTC resistors have impedances significantly less than the tip and ring feed resistors.

* * * * *